United States Patent [19]

Holland

[11] 4,220,676

[45] Sep. 2, 1980

[54] METHODS AND COMPOSITIONS USING OAK LEAF EXTRACT

[76] Inventor: Elaine A. Holland, Rte. 1 - Box 280, Prudenville, Mich. 48651

[21] Appl. No.: 14,937

[22] Filed: Feb. 26, 1979

[51] Int. Cl.$^2$ .............................................. B08B 3/04
[52] U.S. Cl. ....................................... 427/165; 134/6; 134/42; 252/173; 252/DIG. 10; 427/163; 427/369
[58] Field of Search ........................... 134/42, 28, 6, 4; 252/173, 89.1, 142, 132, 83, DIG. 10, 84; 435/264; 427/165, 163, 385 B, 369, 385 A

[56] References Cited

U.S. PATENT DOCUMENTS

| | | | |
|---|---|---|---|
| 144,254 | 11/1873 | Burfitt | 252/83 |
| 203,712 | 5/1878 | Daymon | 252/173 X |
| 371,775 | 10/1887 | Mast | 252/83 |
| 388,759 | 8/1888 | Cameron | 252/83 |
| 411,320 | 9/1889 | Boogher | 252/84 |
| 1,526,501 | 2/1925 | Mullen | 252/DIG. 10 |
| 1,675,227 | 6/1928 | Reeve | 252/173 |
| 2,428,187 | 9/1947 | Wegst et al. | 252/DIG. 10 |
| 3,635,797 | 1/1972 | Battistoni et al. | 435/264 X |
| 4,094,701 | 6/1978 | Fekete | 252/84 X |

FOREIGN PATENT DOCUMENTS 49-113811  10/1974  Japan ........................ 427/165

OTHER PUBLICATIONS

Chem. Abstracts 17:744; Freudenberg et al., (1922).

*Primary Examiner*—Kenneth M. Schor

[57] ABSTRACT

The use of a diluted aqueous extract of oak leaves as a cleaner and plant growth stimulant is described. To provide the extract, dried leaves are preferably boiled in water to extract and disperse natural tannins and waxes from the leaves into the water. The extract is diluted with water for use as a cleaner, particularly for window glass, or for use in stimulating the growth of plants.

6 Claims, No Drawings

METHODS AND COMPOSITIONS USING OAK LEAF EXTRACT

BACKGROUND OF THE INVENTION

The present invention relates to methods and compositions using a diluted natural extract of dried oak leaves for cleaning and for plant growth stimulation. The extract is preferably derived by boiling the oak leaves in water and then diluted with water.

PRIOR ART

Plant materials have been used for many purposes and have been incorporated into cleaners. It is not believed that the prior art has used an extract of dried oak leaves for any purpose related to cleaners. The use of such an extract for plant growth stimulation also is believed to be unknown.

OBJECTS

It is therefore an object of the present invention to provide a cleaner and plant growth stimulant composition which is prepared from an extract of dried oak leaves. It is particularly an object of the present invention to provide a composition derived from dried oak leaves which is simple and economical to prepare and use. These and other objects will become apparent from the following description.

GENERAL DESCRIPTION

The present invention relates to the improvement in a method for cleaning a surface of an object by means of a cleaner which is applied to the surface and then rubbed against the surface which comprises applying and rubbing an aqueous mixture containing an effective amount of an extract of dried oak leaves, preferably an extract prepared by boiling the leaves in water so as to extract water soluble or dispersible components. The present invention also relates to the method for stimulating the growth of plants which comprises: applying an aqueous mixture containing an effective amount of an extract of dried oak leaves to the plants, preferably an extract prepared by boiling the leaves in water to extract water soluble components to the plants. The present invention further relates to a composition useful as a cleaner or plant growth stimulant which comprises an extract of dried oak leaves having essentially the composition of an extract prepared by boiling the leaves in water to extract soluble or dispersible components; and water to dilute the extract wherein the ratio by volume of extract to water is at least 1 to 1. It has been found that the compositions of the present invention are very effective for cleaning window glass without streaking.

The boiling of the oak leaves in water extracts soluble or dispersible waxes from the dried leaves and other compounds, the combination of which forms an emulsion when diluted with water. Other solvents which function the same as water can also be used for the extraction. Preferably the boiling with water is for at least about 10 minutes. The extract has a tea like appearance and smell.

Oak leaves are acidic and have very hard wax coatings which retards the decomposition of the leaves on the ground after they fall from the trees. The exact composition of the extract is unknown but probably includes water soluble or hydrolyzed tannins. Some reaction of the components of the dried leaves could occur upon heating during boiling at 212° F. in water. Natural waxes in general are described in Kirk-Othmer Volume 22, pages 156 to 173 (1970); however, no mention is made of the use of oak leaves for any purpose.

SPECIFIC DESCRIPTION

The following are examples of the preparation of the extracts and the uses of the compositions of the present invention.

EXAMPLE 1

Fallen, dried oak leaves (white oak) were gathered. The leaves were placed in an eight (8) quart pan to fill the pan and then water was added to completely immerse the leaves. The volume of closely packed leaves was about 2 quarts. The bulk volume ratio of leaves to water was thus about 1 to 4. The leaves were boiled in the water for about 10 minutes and then the leaves were strained from the hot extract solution using a cloth. The extract was then diluted with about 9 to 10 parts water (hot or cold) to 1 part extract by volume. The aqueous mixture was then bottled for use and yielded about 7 quarts. It was stable to separation for long periods of time. Upon use of the aqueous mixture on window glass, it was found that the glass was streak free, clean and resisted soiling or spotting.

EXAMPLE 2

As a plant food and cleaner one cup of the extract of Example 1 was diluted with water in a ratio of 1 to 8 by volume. This yielded about 2 quarts of the aqueous mixture. The aqueous mixture was very effective in stimulating the growth of house plants, particularly when it was applied to the leaves to polish them, but was also effective when applied to the roots.

The composition is comparable to or better than existing commercial aqueous glass cleaning compositions. It is also inexpensive. The composition cleans windows, mirrors, woods, vinyl, chrome, and all painted metal including cars and marble surfaces leaving them not only sparkling clean but also giving them a protective wax covering that makes the next cleaning easier. Soaking heavily soiled and burned food residues on trays in the aqueous mixture makes cleaning easier due to the softening power. The composition not only cleans and waxes in one operation but produces no streaking or no yellowing build-up of waxes as is possible with other waxing agents. The composition is odorless, non-flammable and non-poisonous to animals. It leaves the surfaces with a sparkling shine which is resistant to fingerprints and dust. Chimneys on oil burning lamps that normally would build up carbon upon burning do not have any build-up of carbon or smoke after many hours of use. The composition cleans leaves on house plants with no ill effect and also stimulates their growth when used to water the plants. It cleans eyeglasses and cigarette smoke does not build up as rapidly on car windshields and it does not produce glare or flashback because there is no film to produce reflected light. The composition cleans jewelry and particularly makes diamonds sparkle. Many other uses will occur to those skilled in the art.

I claim:

1. In a method for cleaning and wax polishing a surface of an object by means of a combination cleaner and wax applied to the surface and then rubbed against the surface the improvement which comprises:

applying and rubbing an aqueous mixture containing an effective amount of an aqueous extract of dried oak leaves containing waxes and tannins soluble or dispersible in boiling water to thereby clean and wax the surface.

2. The method of claim 1 wherein the extract is prepared by boiling the leaves in water so as to extract water soluble or dispersible components.

3. The method of claim 2 wherein the leaves are boiled in water for at least about 10 minutes, the extract is separated from the boiled leaves and then diluted with water.

4. The method of claim 3 wherein the dilution of the extract to water is between about 1 to 1 and 1 to 100 parts by volume.

5. The method of claim 1 wherein the surface is glass.

6. The method of claim 5 wherein the glass is window glass.

* * * * *